United States Patent [19]
La Haye

[11] 3,885,903
[45] May 27, 1975

[54] REDUCTION OF POLLUTANTS IN GASEOUS HYDROCARBON COMBUSTION PRODUCTS

[75] Inventor: Paul G. La Haye, Cape Elizabeth, Maine

[73] Assignee: Aqua-Chem, Inc., Milwaukee, Wis.

[22] Filed: Oct. 30, 1972

[21] Appl. No.: 302,133

[52] U.S. Cl. .................... 431/8; 431/188; 431/351
[51] Int. Cl. ........................ F23c 11/00; F23c 9/02
[58] Field of Search ............ 431/8, 9, 10, 168, 182, 431/188, 351, 352

[56] References Cited
UNITED STATES PATENTS
3,175,361  3/1965  Schirmer et al. .............. 60/39.65 X
3,736,747  6/1973  Warren .............................. 60/39.65

Primary Examiner—Charles J. Myhre
Assistant Examiner—William C. Anderson
Attorney, Agent, or Firm—Fred Wiviott; Ralph G. Hohenfeldt

[57] ABSTRACT

Fuel and less than the amount of air for stoichiometric combustion are injected into a combustion chamber so that the fuel rich mixture burns as a core in the combustion chamber. The balance of the air for substantially stoichiometric combustion is injected coaxially and rotationally as a sheath or vortex which surrounds the core. Where the core is hot and rich, there is little mixing of the sheath air and core gases and the available oxygen combines preferentially with fuel components other than nitrogen so that little nitrogen oxides are produced. After some heat is extracted from the gases in the core, more complete mixing of the sheath air and core gases occurs. Under these lean and cool combustion conditions, production of nitrogen oxides is also unsubstantial. Means for mixing the gas streams may be disposed adjacent the exit end of the combustion chamber when necessary to promote turbulence and further mixing of the air and hot gases for bringing about complete combustion of any residual combustibles. In the larger combustion systems within long furnaces means of promoting turbulence may not be required to complete combustion.

19 Claims, 5 Drawing Figures

PATENTED MAY 27 1975　　3,885,903

REDUCTION OF POLLUTANTS IN GASEOUS HYDROCARBON COMBUSTION PRODUCTS

BACKGROUND OF THE INVENTION

This invention relates to a method and apparatus for reducing air polluting agents such as nitrogen oxides, carbon monoxide, carbonaceous particulates and unburned hydrocarbons in the exhaust gases of carbonaceous and hydrocarbon fuel burners.

The conventional method of burning gaseous, liquid and finely divided solid fuels is to inject the fuel and air in excess of the stoichiometric amount into a combustion chamber under conditions which promote intimate mixing of the air and fuel and supposedly more complete combustion of the fuel. Generally, the objective is to burn the fuel as completely and rapidly as possible and under the highest temperature conditions so that no hydrocarbons, carbon or other particulars or carbon monoxide remain unburned. Although this method desirably yielded exhaust gases which are high in harmless carbon dioxide and relatively low in noxious carbon monoxide, it also resulted in high noxious nitrogen oxide levels in the exhuast gas. Thus, this prior practice was self-defeating insofar as reduction of carbon monoxide and nitrogen oxides are concerned since a reduction in one usually occurs at the expense of an increase in the other. It is evident, therefore, that air pollution control standards for maximum atmospheric emmission of these pollutants are not easily met by burning fuel in the traditional manner.

Nitrogen oxides that appear in the exhaust gases result from oxidation of nitrogen in the air which is required for combustion and from nitrogen in the fuel itself. Most fuels contain some nitrogen compounds and heavy hydrocarbon fuels that are used for commercial purposes are particularly rich in nitrogen compounds which are at least partially converted to nitrogen oxides under high temperature combustion conditions. According to conventional practice, all of the fuel is burned as rapidly and as intensely as possible to produce gases as hot as 3200° F which is desirable for minimizing unoxidized components in the exhaust gases but this increases nitrogen oxides as stated.

The present invention is based in part on the recognition that if combustion occurs at above 1900° F and below about 2600° F substantially all of the hydrocarbons, carbonaceous particulates and carbon monoxide will be oxidized but a minimum of nitrogen oxides are produced.

SUMMARY OF THE INVENTION

In accordance with the present invention, combustion is carried out under conditions which are opposite from those prevailing in conventional practice. That is, the fuel is not burned rapidly and as hot as possible under stoichiometric conditions but is burned in stages and under conditions where temperature is suppressed. Nitrogen oxide production is inhibited by burning the fuel with a paucity of air or under rich conditions where the gases are the hottest and with adequate air for completing stoichiometric combustion or under lean conditions where the gases are cooler.

According to the invention, fuel is injected with a nozzle into a combustion chamber along with little air such as in the order of about 20% of the stoichiometric amount. The fuel so injected burns as a fuel rich core which is fairly well defined peripherally at the inlet end of the combustion chamber. The balance of the air required to make up the stoichiometric amount, and usually a slight excess, for complete combustion is injected coaxially with the core from the inlet end of the chamber so as to produce a sheath of air surrounding the core. This sheath may take the form of a vortex having both axial and rotational velocity components with the latter tending to cause the air sheath to follow the contour of the combustion chamber to minimize mixing of the air in it with the component gases of the core. In addition, because the outer combustion chamber walls may be cooled, the air sheath can be held to a temperature below that at which nitrogen oxides are formed. There is little mixing of the vortex air and the hot core gases at the inlet end of the combustion chamber but substantial mixing occurs as the air progresses beyond a point approximately 1½ to 2 combustion chamber diameters from the inlet. A substantial portion of the total nitrogen oxides formed in the combustion chamber are produced at the inlet end where the flame is initiated. This results from the elevated temperatures at the combustion chamber inlet end and because the fuel is in a transition stage wherein it is in the process of evaporating, gasifying and mixing throughout the core. Following this transition zone, the formation of nitrogen oxides in the fuel rich core is minimal even though the temperature is relatively high because of the preferential oxygen-unburned hydrocarbon reaction.

Separation or stratification of the hot core gases and the vortex air is maintained not only because of the air velocity but also because of it being much cooler than the hot gases in the core. Experience confirms that cool gases also have a tendency to remain unmixed with hot gases unless mechanical mixing is induced or sufficient time elapses for convection and radiation to equalize the temperature of the gases. A strong vortex exists for up to about 2½ times the diameter of the combustion chamber after which the vortex air becomes somewhat mixed with the core gases. As the core is propagated down the combustion chamber it loses heat by radiation, and near the exit end where mixture of sheath air with the core is more complete, less rich combustion takes place at temperatures below that where substantial amounts of nitrogen oxides are formed.

At the inlet end of the combustion chamber, a strong negative pressure gradient which exists from the periphery of the vortex but to the center of the core, but this is substantially dissipated at the exit end and there is significant mixing of the vortex air and core gases whereby all of the combustibles such as carbon monoxide, carbon, carbonaceous compounds and other particulates are not fully oxidized. Flow velocity is relatively low near the exit end of the combustion chamber, and static pressure head is relatively high. To promote complete mixing and combustion, a mixing means may be provided at the exit end of the combustion chamber. The mixing means may take form of a screen which produces a pressure drop between the inside and outside of thhe primary combustion zone, causing conversion of static pressure head to velocity head. The increased velocity of the air and gas mixture promotes turbulence and good mixing of the air and the hot core gases and tends to spread the hot stratified pockets throughout the remaining exiting gases. In this manner, final and complete combustion is caused to make place in and beyond the orifices at substantially uniform temperatures which are below that where substantial quantities of nitrogen oxides are formed.

It is a primary object of this invention to provide a combustion method and apparatus wherein nitrogen oxides, carbon monoxide, gaseous and particulate hydrocarbons and carbonaceous products in the exhaust gas are substantially minimized.

A further object of this invention is to provide a combustion method and apparatus for minimizing the aforementioned atmospheric pollutants without adversely affecting the efficiency of the combustion process.

A more specific object of the invention is to stratify the combustion constituents to burn fuel in a fuel rich core in the early stages of the combustion process where temperature is high while holding the air required for complete combustion in isolation until some heat is extracted from the core in which case the air is mixed therein and further combustion takes place under low temperature conditions at which significant quantities of nitrogen oxides are not produced but other noxious substances having calorific value are consumed before the gases are discharged to the atmosphere.

Still another general object of the invention is to provide a combustion method and apparatus which is applicable to various fuel burning devices such as water tube boilers, fire tube boilers, forced circulation boilers and, indeed, to many other devices in which fuels are burned in finely divided form.

How the above-mentioned and other more specific objects of the invention are achieved will appear in the more detailed description of an illustrative embodiment of the invention which will be set forth shortly hereinafter in reference to the drawings.

DESCRIPTION OF A PREFERRED EMBODIMENT

Figure 1:
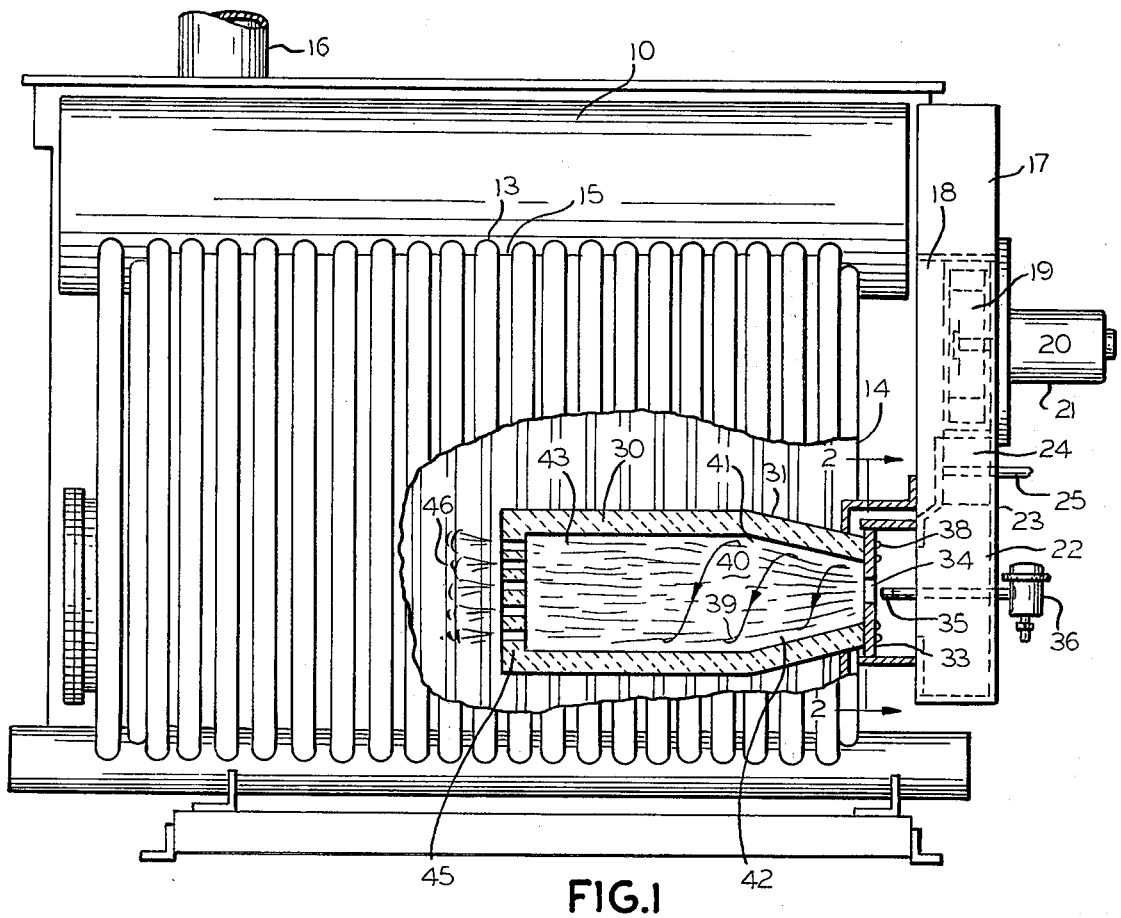
FIG. 1 shows a boiler with parts broken away to illustrate the new combustion device incorporated therein.

Although the principles of the new combustion method and apparatus are applicable to various combustion devices, the invention will be described for convenience in connection with a water tube boiler such as is illustrated in FIG. 1. The boiler is essentially conventional and may include an upper drum 10 and a lower drum 11 which are connected together by means of a plurality of water-filled tubes 13 on the foreground side and another plurality of tubes 14 on the background side. The tubes have membranes 15 welded between them. The tubes in conjunction with their webs and the drums define a cavity in which heat is exchanged between hot combustion gases discharged from a combustion chamber and the water or steam within the tubes. The exhaust gases from which most of the heat is extracted are discharged to the atmosphere through a stack 16 which is shown fragmentarily. The housing of the boiler has been omitted for the sake of brevity.

At the front end of the boiler there is a compartment 17 in which there is a fan chamber 18. Within the chamber is a fan blade 19, preferably of the curved blade centrifugal type, which is mounted on the shaft 20 of a motor 21. At its lower end, compartment 17 is subdivided into a plenum chamber 22 which communicates with the fan chamber 18 through a duct 23. There is a controllable damper 24 located in the duct and it is mounted for rotation on a shaft 25. Damper 24 is used in a substantially conventional manner to control the amount of air delivered to the combustion chamber of the boiler. Although the parts are not shown, it will be understood by those skilled in the art that damper 24 is coupled with a cam, not shown, which operates a fuel control valve, not shown, so that the ratio of fuel-to-air may be controlled in accordance with the variant thermal demand of the boiler. The motor used for simultaneous control of the damper 24 and the fuel flow regulating valve is not shown since it and its control means are substantially conventional.

The construction and unique operating characteristics of the new combustion chamber and method will now be described. The illustrative combustion chamber in FIG. 1 comprises a ceramic which has a cylindrical portion 30 and a conically reduced portion 31 at its inlet end which defines a cylindrical internal combustion chamber that is conical at one end although it should be understood that the chamber may be a uniform cylinder as well. For the purposes of the invention a cylindrical combustion chamber is preferred but other configurations could be used, as long as an annular sheath of air can be maintained therein as will be explained. It should also be understood that the combustion chamber need not be of the refractory lined type but may be a water jacket type having inner and outer shells between which water flows for directly absorbing heat from the flame within the combustion chamber. In fact, various types of conventional combustion chambers may be used as long as they are sufficiently elongated and absorb heat for purposes of the invention which will soon be apparent.

At the inlet end of the combustion chamber there is a plate 33 having a central aperture 34. Concentric with aperture 34 is the tip 35 of a fuel injection nozzle which connects with the fuel flow control valve 36. Pressurized air received in plenum chamber 22 flows through aperture 34 and combines with fuel that is injected from nozzle 35 and, assuming that ignition has taken place, results in production of a core of hot gases 38 which is shaded in FIG. 1 to indicate its general configuration. In accordance with the invention, the size of aperture 34 is so chosen that it will allow delivery of an amount of air which is far less than the stoichiometric amount required for complete combustion of the injected fuel in the core. As an example, and without limitation, about 20% of the stoichiometric amount of air is admitted through aperture 34 and used to promote combustion in the fuel rich core 40.

Figure 2:
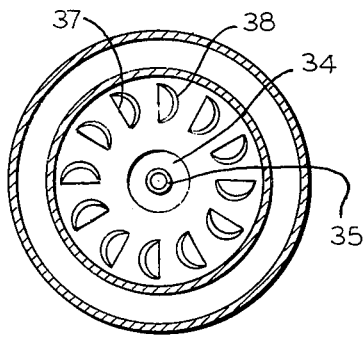
FIG. 2 is an elevation view of a vortex producing device as seen looking toward the plane 2—2 in FIG. 1.

Apertured plate 33, as can be seen particularly well in FIG. 2, is also provided with a plurality of openings 37 from which circumferentially inclined vanes 38 are formed by piercing. The remainder of the air for stoichiometric combustion, and usually a slight excess is injected into the combustion chamber through openings 37. In the preferred embodiment of the invention the air from plenum 22 may be passed through the openings 37 for having a circular motion imparted to it, so as to form a substantially circular sheath or annulus of rotating and axially moving air around core 40. The rotating sheath of air occupies the unshaded annular space 41 within the combustion chamber. Helical advancement is suggested by the arrowheaded line 39. It will be noted that the sheath is thicker near the inlet end of the combustion chamber and that it gradually diminishes toward the exit end whereupon it mixes with the hot gases from core 40. Of course, there is some mixing of the air in the sheath with the gases in the core throughout the length of the core but generally the two remain fairly well separated for preferably as much as 2½ times the diameter of the combustion chamber as measured from the inlet end. Toward the exit end, of course, there is substantial mechanical mixing and equalization of the pressure of the sheath air and the core gases. In the middle section of the combustion chamber and near the inlet end, rotational velocity of the sheath is rather high and the sheath together with the core gases form a vortex which diminishes in pressure in the radial direction from the outside toward the center of the core. By way of example, in one design the initial vortex rotational velocity was from 1.5 to 2.5 times the average axial velocity of the gases in the combustion chamber. As mentioned earlier, the sheath air is inhibited from mixing with the core gases at their interface, not only because of the rotational velocity of the sheath, but also because of the sheath being significantly cooler than the core gases.

It should be understood that the vaned diaphragm plate 33 used for emparting rotational velocity as well as axial velocity to the air sheath is not the only structure that can be used for such purposes. For instance, a plurality of circularly arranged tubes, not shown, that are angulated axially and radially could also be used to produce a swirling air sheath or vortex and a device similar to an inclined or convolute fan blade could also be used. Moreover, additional vortex producing means may be installed axially along the combustion chamber to extend the length of the rotating sheath. The latter construction may be used where the combustion chamber is very long and has a large diameter. Further, the air sheath may be introduced axially rather than in the form of a vortex so long as it is injected with sufficient velocity to maintain the desired degree of separation between the core and air sheath. The region where most of the nitrogen oxides are produced is at the interface of the sheath and core but the amounts produced are much less than in conventional burners where the air and fuel are completely mixed near the inlet end of the combustion chamber. In the present case, even though some of the sheath air may be hot enough to promote nitrogen oxide production at the periphery of the core, the core is rich in carbon monoxide and other unburned components which tend to combine with the oxygen in the air in preference to combining with the nitrogen. tert.-butoxide A considerable amount of heat is convected, conducted and radiated from the core 40 and other hot gases in the combustion chamber to the wall thereof from which it is further radiated to the boiler tubes. This prevents the gases within the combustion chamber from rising to a significant degree above 1800° F as the gases flow toward the exit or terminal end of the combustion chamber which is marked 43. In the region 43, there is substantial mixing of the sheath air into the core gases and further combustion takes place under fuel-lean conditions. However, because some heat has been extracted from the gases and because a portion of the fuel remains unburned they are still well below a temperature at which significant nitrogen oxides are produced and the combustion which results from intermixture of the gases at the exit region of the chamber does not result in temperatures being exceeded at which significant quantities of nitrogen oxides would be produced.

The gases in region 43 within the combustion chamber may still have unmixed pockets of sheath air in them and the gases usually contain significant quantities of carbon monoxide, carbonaceous particulates and minor amounts of hydrocarbons which must be burned or oxidized to carbon dioxide and water before being discharged to the atmosphere through the stack. Since the diameter of the combustion chamber in region 43 is rather large, gas flow velocity is relatively small and the total pressure of the gas is mainly static pressure head. In accordance with the invention, a portion of the static pressure head is converted to velocity head at the exit end of the combustion chamber by discharging the gases through a mixing means which may take the form of a screen consisting of a plurality of orifices that are formed in a barrier 45 which may be perforated fire brick, refractory metal or other suitable temperature resistant material. Transformation of a portion of the static head to velocity head upsets the substantially stratified flow conditions which exist inside of the combustion chamber and effectuates turbulent flow outside of the combustion chamber in the region marked 46. Thus, in region 46 there is high turbulence and thorough mixing of the air and the residual incompletely oxidized products which results in such products being oxidized or burned at temperatures above 1900° F but well below 2600° F where significant nitrogen oxides would be produced. Thus, the carbon monoxide which existed in concentrations as high as tens of thousands of parts per million of core gas within the primary combustion zone are finally completely oxidized at the exit end of the combustion chamber before the gases are discharged to the boiler chamber with quantities of carbon monoxide and nitrogen oxides which are well below present emission control standards.

Figure 3:
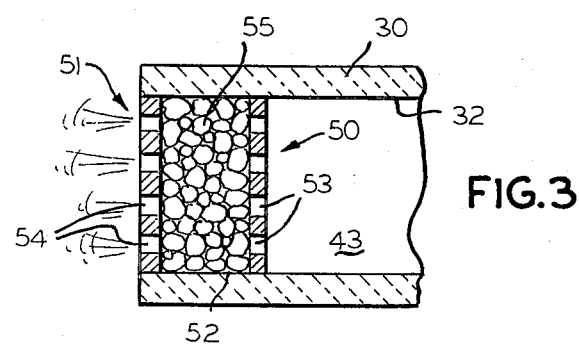
FIG. 3 is a section of an alternative type of velocity transforming and mixing device for combustion gases.

Various devices may be substituted for the perforated refractory barrier 45 in FIG. 1 to convert a portion of the static head within the primary combustion zone to velocity head outside of the chamber for the purpose of promoting turbulence and intimate mixing of the residual air and unoxidized components of the gases. An alternative device is shown in FIG. 3. In this embodiment barriers 50 and 51 made of refractory material are situated near the exit end of the combustion chamber and are spaced apart in the downstream direction to define a space 52 between them. The serially disposed barriers 50 and 51 have a plurality of orifices 53 and 54, respectively. Space 52 is occupied by a bed of granular material 55 which maybe silicon carbide, ceramic, metal or other suitable refractory substance. The input orifices 53 increase gas velocity and the granular material promotes mixing of the gases in the intertices of the granules. A velocity change, turbulence and more complete oxidation of the gaseous mixture is effected by the output orifices 54 as in the previously described embodiments. The orifices in the barriers may have different sizes or there may be different numbers of orifices for the purpose of controlling pressure and velocity relationships in a manner that produces the best results in a particular case.

Other alternatives include stacking bricks in the exit region of the chamber with spaces between them to provide the velocity transforming orifices. A plurality of tubes, not shown, in a header plate with the tubes extending axially or in the downstream direction may also be used for this purpose. Additionally this mixing may be accomplished by a series of orifices or restrictions, baffles, one or more apertured plates, or variously configured beds of granular material and the like.

Figure 4:
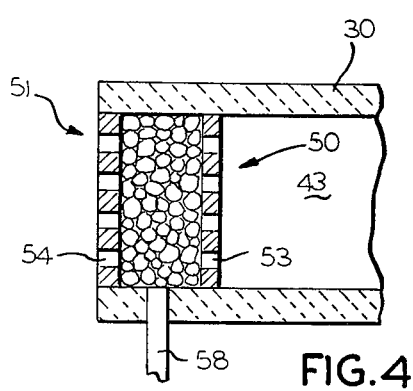
FIG. 4 shows a fragmentary cross section of a modification of the embodiment of FIG. 3.

FIG. 4 illustrates a modification of the embodiment of FIG. 3 the invention wherein a source of secondary air is introduced into the gap between barriers 50 and 51 by means of a delivery pipe 55. The total air delivered to the primary combustion zone through the inlet of the combustion zone as discussed hereinabove plus that delivered by means of pipe 55 will be substantially equal to the stoichiometric amount. However, the delivery of a portion of this air outside of the primary combustion zone insures that the fuel will be burned under rich conditions in said zone thus maintaining lower peak temperatures with a high level of carbon monoxide and other unburned hydrocarbons.

Figure 5:
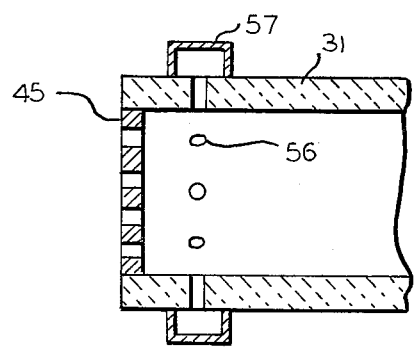
FIG. 5 shows a fragmentary cross section of a modification of the embodiment of FIGS. 1 and 2.

FIG. 5 illustrates a modification of the embodiment of FIG. 1 wherein a portion of the total air required for stoichiometric combustion is introduced into the primary combustion zone at a point adjacent the inner end of the mixing barrier 45. This may be accomplished in any suitable manner such as by apertures 56 formed through the cylindrical portion 31 and a surrounding plenum chamber 57 which is coupled to a suitable source of air. The remaining portions of the air required for stoichiometric combustion are introduced in the manner discussed with respect to the embodiment of FIG. 1.

In one experimental embodiment of the burner of FIG. 1, the gas velocity within the combustion chamber made in accordance with the invention was found to have an axial velocity component of 100 feet per second with a pressure drop across the orifices of 1.6 inches of water and this resulted in good mixing. In data taken with the same combustion chamber, it was found that under particular combustion conditions, the nitrogen oxides level in front of the mixing barrier 45 was about 30–90 parts per million. After passing through the mixing barrier 45, the nitrogen oxides in the gases were between 40 and 70 parts per million. The stack gases had nitrogen oxide levels well under 100 parts per million and insubstantial levels of carbon monoxide.

The design parameters of the new apparatus and method are not subject to being specified numerically in a universally applicable manner because they are not totally independent of each other. Generally, the circumferential velocity of the air sheath is a function of input pressure and should be sufficient to maintain it for 1.5 to 2.5 combustion chamber diameter downstream. The location of the orificed velocity changing barrier also has to be considered in view of circumstances. If the orifice barrier is too close to the inlet end there may be insufficient opportunity for air fuel mixing and combustion and the release of a portion of the heat of combustion. This would cause combustion in the orifice barrier to take place at nitrogen oxide forming temperatures. If the barrier is located too far from the burner, the stratified flow reaches excessive tempertures which promotes the formation of nitrogen oxides. The percentage of the stoichiometric amount of air introduced with the fuel into the central core is also variable but in any case this amount of air should be low so as to produce very rich combustion conditions and high concentration of carbon monoxide in the core to suppress the formation of nitrogen oxides. An important requirement is that the combustion bases be maintained rich in combustibles where the flame is the hottest and lean in combustibles where the flame is cooler and where air is intentionally injected into the gases. Another consideration is that the core and air sheath should be separated or stratified through much of the combustion chamber length and mixed or destratified at the exit end and in the discharge region outside of the combustion chamber.

The barrier 45 may be omitted in large and long combustion chambers 30 provided the combustion chamber is cooled substantially and it is substantially long to complete the mixing and destratification prior to exiting. Thus, the combustion chamber has a gas exit region and in any case a substantial mixing of the added oxygen-containing gas and the gaseous combustion products of the core occurs completely.

Although one embodiment of the invention has been described in considerable detail, such description is intended to be illustrative rather than limiting, for the new method and apparatus may be variously executed and are to be limited only by interpretation of the claims which follow.

I claim:

1. A method of burning fuel in a manner to reduce the nitrogen oxides, carbon monoxide, and unburned hydrocarbons and carbonaceous particulates in the exhaust gases therefrom, comprising:
    a. developing in a continuous combustion zone an ignited core stream constituting a fuel-rich mixture of fuel and substantially less than the amount of air required for stoichiometric combustion,
    b. introducing into said continuous combustion zone a sheath of air which surrounds and interfaces directly with said core stream and which flows therealong without discontinuity, the quantity of air introduced as said sheath being at least the entire quantity of additional air and not substantially more than the additional air required to make up the stoichiometric amount for complete combustion of said fuel,
    c. passing said sheath in a heat exchange relation with cooling means for extracting some heat permanently from said core stream, and then
    d. allowing the incompletely oxidized gaseous combustion products and said sheath air to mix in non-discrete stages in said combustion zone and effect further combustion of some of the theretofore incompletely oxidized components of said fuel at a low enough temperature to avoid production of substantial quantities of nitrogen oxides.

2. The method set forth in claim 1 and introducing the air forming said sheath entirely from the one end of the combustion zone proximate to the upstream end of said core stream.

3. The method set forth in claim 1 including the step of increasing the velocity of said mixture to promote turbulence in said mixture and effect more complete mixing thereof and enhance oxidation of residual combustibles other than nitrogen.

4. The method set forth in claim 1 and including the step of:
   a. rotating said sheath of air around at least an upstream portion of said core stream whereby said rotation will tend to retard mixing of said streams and substantially prevent air becoming available for complete combustion of combustibles or for significant oxidation of nitrogen in said core stream.

5. The method set forth in claim 1 and passing said core stream through a combustion zone in a substantially straight line path and without helical motion.

6. The method set forth in claim 1 wherein the heat extracted from said sheath is dissipated by said cooling means elsewhere than to the gases derived from said core stream and sheath in said combustion zone.

7. The method set forth in claim 1 wherein said incompletely oxidized combustion products and air sheath is progressively mixed to effect the progressive combustion of said incompletely oxidized fuel and combustion products at under 2600°F everywhere in said combustion zone.

8. The method set forth in claim 7 and including the step of:
   a. rotating said sheath of air around at least an upstream portion of said core stream whereby said rotation will tend to retard mixing of said streams and substantially prevent air becoming available for complete combustion of combustibles or for significant oxidation of nitrogen in said core stream.

9. The method set forth in claim 7 and passing said core stream through a combustion zone in a substantially straight line path and without helical motion.

10. The method set forth in claim 1 and including the step of dissipating the heat extracted from said sheath by said cooling means to additional heat absorbing means outside of said combustion zone.

11. The method set forth in claim 10 and rotating said sheath of air around at least an upstream portion of said core stream whereby said rotation will tend to retard mixing of said streams and substantially prevent air becoming available for complete combustion of combustibles or for significant oxidation of nitrogen in said core stream.

12. The method set forth in claim 11 including the step of increasing the velocity of said mixture to promote turbulence and more complete mixing thereof whereby to enhance oxidation of residual combustibles other than nitrogen.

13. The method set forth in claim 12 including:
   a. maintaining the temperature of said gaseous mixture at least above 1800°F to substantially oxidize residual carbon monoxide, hydrocarbons and carbonaceous particulates and below about 2400°F to avoid oxidation of substantial nitrogen.

14. A method of burning fuel in a manner to reduce nitrogen oxides, carbon monoxide, unburned hydrocarbons and carbonaceous particulates in the exhaust gases therefrom, comprising:
   a. injecting into a continuous combustion zone fuel and substantially less than the amount of air required for stoichiometric combustion of said fuel to produce an ignited fuel-rich core stream directed from the input upstream end generally toward the output downstream end of said combustion zone, and
   b. flowing into said continuous combustion zone in direct contact with said core stream from said input end toward said output end additional air to sheath said core stream and progressively intermix therewith in non-discrete stages while at the same time absorbing heat from said sheath air and said mixture with cooling means that dissipate said heat permanently to heat absorbing means outside of said combustion zone and other than to air that is introduced to said zone, the quantity of said additional air being at least equal to and not substantially greater than that required to make up the stoichiometric amount for complete combustion of all of the injected fuel.

15. A method of burning non-solid fuel characterized by the steps of:
   a. projecting into a combustion zone fuel and air for forming an ignited core stream that is propagated in an axial direction in said zone, the amount of air admitted with the fuel being substantailly less than that required for stoichiometric combustion of the fuel,
   b. flowing additional air into said zone from the input end in surrounding relationship to the core stream initially and intermixing said core stream and air in non-discrete stages and in a continuous and progressive manner by mutually generally radially outward movement of the core stream gaseous products and generally inward movement of said additional air as the gaseous core stream products and air progress in the axial direction of the combustion zone, the quantity of additional air being at least equal to but not substantially greater than the air required to make up the quantity for stoichiometric combustion of the fuel, and
   c. transferring heat from at least the radially outward portions of the gases flowing in said combustion zone to heat absorbing means extending from near said input end of said zone to a substantial distance in the axial direction from said input end, said absorbing means extracting heat permanently from said combustion zone whereby the temperature of the gases in said combustion zone is maintained below that at which substantial quantities of nitrogen oxides are produced.

16. The method set forth in claim 15 including:
   a. maintaining the temperature of said gaseous mixture at least above about 1800°F to substantially oxidize residual carbon monoxide, hydrocarbons and carbonaceous particulates and below about 2400°F to avoid oxidation of substantial nitrogen.

17. The method set forth in claim 15 including the step of inducing turbulence and additional mixing of the gaseous combustion products hear the output end of said zone whereby to enhance burning of residual combustibles in said products at a temperature below that at which substantial nitrogen oxides are produced.

18. A method of burning fuel in a manner to reduce the nitrogen oxides, carbon monoxide, and unburned hydrocarbons and carbonaceous particulates in the exhaust gases therefrom, comprising:
   a. developing in a continuous combustion zone an ignited core stream constituting a fuel-rich mixture of fuel and substantially less than the amount of air required for stoichiometric combustion,
   b. introducing into said continuous combustion zone a sheath of air which surrounds and interfaces directly with said core stream and which flows therealong without discontinuity, the quantity of air introduced as said sheath being at least the entire quantity of additional air and not substantially more than the additional air required to make up the stoichiometric amount for complete combustion of said fuel, c. passing said sheath in a heat exchange relation with cooling means for extracting some heat permanently from said core stream, and then d. allowing the incompletely oxidized gaseous combustion products and said sheath air to mix in non-discrete stages in said combustion zone and effect further combustion of some of the theretofore incompletely oxidized components of said fuel at a low enough temperature to avoid production of substantial quantities of nitrogen oxides, and e. increasing the velocity of said mixture to promote turbulence and more complete mixing thereof whereby to enhance oxidation of residual combustibles other than nitrogen.

19. The method set forth in claim 18 including:

a. maintaining the temperature of said gaseous mixture at least 1800°F to substantially oxidize residual carbon monoxide, hydrocarbons and carbonaceous particulates and below 2400°F to avoid oxidation of substantial nitrogen.

* * * * *